US011656329B2

United States Patent
Blaes et al.

(10) Patent No.: US 11,656,329 B2
(45) Date of Patent: May 23, 2023

(54) SENSOR CALIBRATION

(71) Applicant: Zoox, Inc., Foster City, CA (US)

(72) Inventors: Patrick Blaes, San Dimas, CA (US); Daniel Miller, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 245 days.

(21) Appl. No.: 17/090,668

(22) Filed: Nov. 5, 2020

(65) Prior Publication Data

US 2021/0055380 A1     Feb. 25, 2021

Related U.S. Application Data (63) Continuation of application No. 15/927,291, filed on Mar. 21, 2018, now Pat. No. 10,830,871.

(51) Int. Cl.
    *G01S 13/931*     (2020.01)
    *G01S 7/40*     (2006.01)
    (Continued)

(52) U.S. Cl.
    CPC .......... *G01S 7/4026* (2013.01); *G01S 7/4972* (2013.01); *G01S 13/931* (2013.01); *G01S 17/931* (2020.01);
    (Continued)

(58) Field of Classification Search
    CPC ................. G01S 13/931; G01S 17/931; G01S 2013/9323; G01S 2013/9324; G01S 7/4026; G01S 7/403; G01S 7/497
    See application file for complete search history.

(56) References Cited

U.S. PATENT DOCUMENTS 7,966,301 B2 *    6/2011    Toyama ................. G06F 16/84
                                                     707/696
2014/0240690 A1     3/2014    Newman et al.
(Continued)

FOREIGN PATENT DOCUMENTS

| CN | 105738915 A | 7/2016 |
|---|---|---|
| EP | 2687868 A1 | 1/2014 |
| WO | WO2013045927 A1 | 4/2013 |

OTHER PUBLICATIONS

Non Final Office Action dated Apr. 15, 2020 for U.S. Appl. No. 15/927,291 "Sensor Calibration" Blaes, 5 pages.
(Continued)

*Primary Examiner* — Timothy A Brainard
(74) *Attorney, Agent, or Firm* — Lee & Hayes, P.C.

(57) ABSTRACT

This disclosure is directed to calibrating sensors for an autonomous vehicle. First sensor data and second sensor data can be captured by one or more sensors representing an environment. The first sensor data and the second sensor data can be associated with a grid in a plurality of combinations to generate a plurality of projected data. A number of data points of the projected data occupying a cell of the grid can be summed to determine a spatial histogram. An amount of error (such as an entropy value) can be determined for each of the projected data, and the projected data corresponding to the lowest entropy value can be selected as representing a calibrated configuration of the one or more sensors. Calibration data associated with the lowest entropy value can be determined and used to calibrate the one or more sensors, respectively.

19 Claims, 6 Drawing Sheets

(51) Int. Cl.
  G01S 7/497 (2006.01)
  G01S 17/931 (2020.01)

(52) U.S. Cl.
  CPC ....... *G01S 7/403* (2021.05); *G01S 2013/9323* (2020.01); *G01S 2013/9324* (2020.01)

(56) References Cited

U.S. PATENT DOCUMENTS

| | | | |
|---|---|---|---|
| 2016/0291149 A1* | 10/2016 | Zeng | G01S 13/874 |
| 2017/0269201 A1* | 9/2017 | Adachi | G01S 13/931 |
| 2017/0371329 A1* | 12/2017 | Giering | G05B 23/0294 |
| 2018/0089843 A1* | 3/2018 | Miecznik | G06T 7/207 |
| 2018/0172813 A1* | 6/2018 | Rao | G01S 13/343 |
| 2018/0299533 A1* | 10/2018 | Pliefke | G01S 7/4052 |
| 2019/0056491 A1* | 2/2019 | Bialer | G01S 13/931 |
| 2019/0293756 A1 | 9/2019 | Blaes et al. | |

OTHER PUBLICATIONS

PCT Search Report and Written Opinion dated Jun. 12, 2019 for PCT Application No. PCT/US2019/022561, 14 pages.

Saez et al, "Underwater 3D SLAM through entropy minimization", 2006 IEEE International Conference on Robotics and Automation (ICRA), Orlando Florida, May 15-19, 2006, IEEE Operations Center, Piscatawau, NJ., pp. 3562-3567.

Sheehan et al, "Automatic Self-Calibration of a Full Field-Of-View 3D n-Laser Scanner", retrieved on Dec. 18, 2012 at <<http://europa.informatik.uni-freiburg.de/files/SheehanHarrisonNewman ISER2010.pdf>> [ International Symposium on Experimental Robotics, Dec. 18, 2010, 14 pages.

Chinese Office Action dated May 11, 2022 for Chinese Application No. 201980020771.8, a foreign counterpart to U.S. Pat. No. 10,830,871, 41 pages.

\* cited by examiner

SENSOR CALIBRATION

CROSS REFERENCE TO RELATED APPLICATIONS

This is a continuation application which claims priority to commonly assigned, co-pending U.S. patent application Ser. No. 15/927,291, filed Mar. 21, 2018. Application Ser. No. 15/927,291 is fully incorporated herein by reference.

BACKGROUND

Many vehicles utilize sensor data for various functions, such as navigation, guidance, and obstacle avoidance. Each of the various functions can be necessary for the effective operation of the vehicles. As such, it is important for the sensors to be calibrated, to provide accurate input to vehicle computing systems. Current calibration techniques can be time consuming and computationally expensive, or may not converge at the optimal solution. Additionally, many current calibration techniques are limited to offline processes, requiring a vehicle to be taken out of service if a sensor is out of calibration and/or alignment. Further, current methods require a human operator for calibration, making the process manual, slow, and potentially imprecise.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed to calibrating sensors for an autonomous vehicle. In some instances, the autonomous vehicle can include multiple sensors (of the same or different modalities), which can represent overlapping fields of view. A first sensor can capture first data of an environment and a second sensor can capture second data of the environment. When the first and second sensors are correctly calibrated (with respect to each other, with respect to the vehicle, and/or internally), the sensor data from the first and second sensors can be combined to produce an aligned representation (e.g., a "crisp" representation) of the environment. However, when the sensors are incorrectly calibrated, the combined sensor data may represent an inaccurate depiction (e.g., a "blurry" representation) of the environment. Such a blurring may result, for example, where the relative positions and/or orientations of the sensors are not accurate. In one example, calibration techniques described herein can be used to calibrate radar sensors mounted on an autonomous vehicle. In some instances, the calibration techniques can include receiving the first sensor data captured by a first sensor and receiving second sensor captured by a second sensor, and projecting the first and second sensor data onto a grid, such as a two-dimensional grid. The first and second sensor data can be projected onto the grid in multiple combinations to generate a plurality of projections. An amount of error (such as an entropy value) can be determined for each projection, and the projection corresponding to the lowest entropy value can be selected as representing a calibrated configuration. Calibration data associated with the lowest entropy value can be determined and used to calibrate the first and second sensors, respectively.

In some instances, the plurality of projections can be generated using a combinatorial search algorithm. That is, in some instances, the plurality of projections can represent an exhaustive combination of calibration characteristics (e.g., calibration angles) for the one or more sensors. As mentioned above, the sensor data can be projected onto a grid, such as a two-dimensional grid. Sensor data projected into a cell of the grid can be summed to count a number of sensor data points associated with each cell. In some instances, projecting the sensor data onto the grid can generate a histogram, such as a two-dimensional spatial histogram. In some instances, the histogram can be normalized to produce a probability distribution. The probability distribution can be used to determine an entropy value associated with the projection, such as a Shannon entropy or Rényi entropy. A projection corresponding to the lowest entropy value can be selected and used to determine calibration data for calibrating the one or more sensors. In some examples, and alternative to a combinatorial search algorithm may use a gradient descent algorithm, which, in some instances, can be used to determine an optimal projection and the corresponding calibration data.

In some instances, the calibration techniques can be used to determine one or more calibration characteristics, and is not limited to determining calibration angles. Fore example, the calibration techniques can be used to determine one or more intrinsic and/or extrinsic characteristics of one or more sensors. For example, a first sensor and a second sensor can be calibrated relative to each other and/or relative to a vehicle. In some examples, a first sensor can be calibrated against itself using sensor data received over time. In some instances, a calibration can be performed for a single extrinsic characteristic (e.g., yaw), while in some instances, a calibration can be performed for any number of extrinsic characteristics (e.g., six degrees of freedom, such as x-location, y-location, z-location, roll, pitch, and yaw). Examples of intrinsic characteristics include, but are not limited to, lens distortion, transmission medium, etc. Additional calibration characteristics may include, but are not limited to, time delay (e.g., of data received from one or more sensors), temperature, compression, and the like.

The calibration techniques discussed herein can improve a functioning of a computing device by providing a framework to determine an optimal calibration for sensors of an autonomous vehicle. In some instances, the combinatorial search algorithm can be used to exhaustively search through potential calibration solutions to promote convergence at an optimal solution. For example, utilizing such a combinatorial search algorithm can avoid converging at a local minimum (when minimizing error), which may not correspond to the optimal solution. By calibrating one or more sensors via the calibration techniques described herein, the one or more sensors can generate data representing an environment with a high degree of accuracy and precision about the environment. For example, sensors such as light detection and ranging (LIDAR) sensors, radar sensors, sonar sensors, and the like that have been calibrated in this manner can provide more accurate data for segmentation, classification, route planning, etc., which can ultimately lead to better safety outcomes while driving. Furthermore, improved calibration of sensors may improve processing in perception systems, for example, by providing more accurate data as a starting point for segmentation, classification, etc. These and other improvements to the functioning of a computing device are discussed herein.

The calibration techniques discussed herein also represent improvements over conventional calibration techniques. For example, in the past, calibration techniques have included adjusting captured data by hand to align one set of data with another set of data. This manual alignment can be slow and can result in a suboptimal calibration. Other conventional calibration techniques have included traversing a region including retroreflective targets with known locations to be used in calibration operations. Further still, conventional calibration techniques have included mounting a vehicle on a turntable and physically turning the vehicle while monitoring the data captured by sensors on the vehicle. These conventional calibration techniques suffer from limited flexibility, often require additional and/or specialized calibration equipment, and/or result in a suboptimal calibration of sensors. Thus, the techniques discussed herein represent significant improvement over conventional calibration techniques.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems requiring calibration of sensors prior to and/or during use, and is not limited to autonomous vehicles. In another example, the methods, apparatuses, and systems may be utilized in an aviation or nautical context. Additionally, the techniques described herein may be used with real data (e.g., captured using sensor(s)), simulated data (e.g., generated by a simulator), or any combination of the two.

Figure 1:
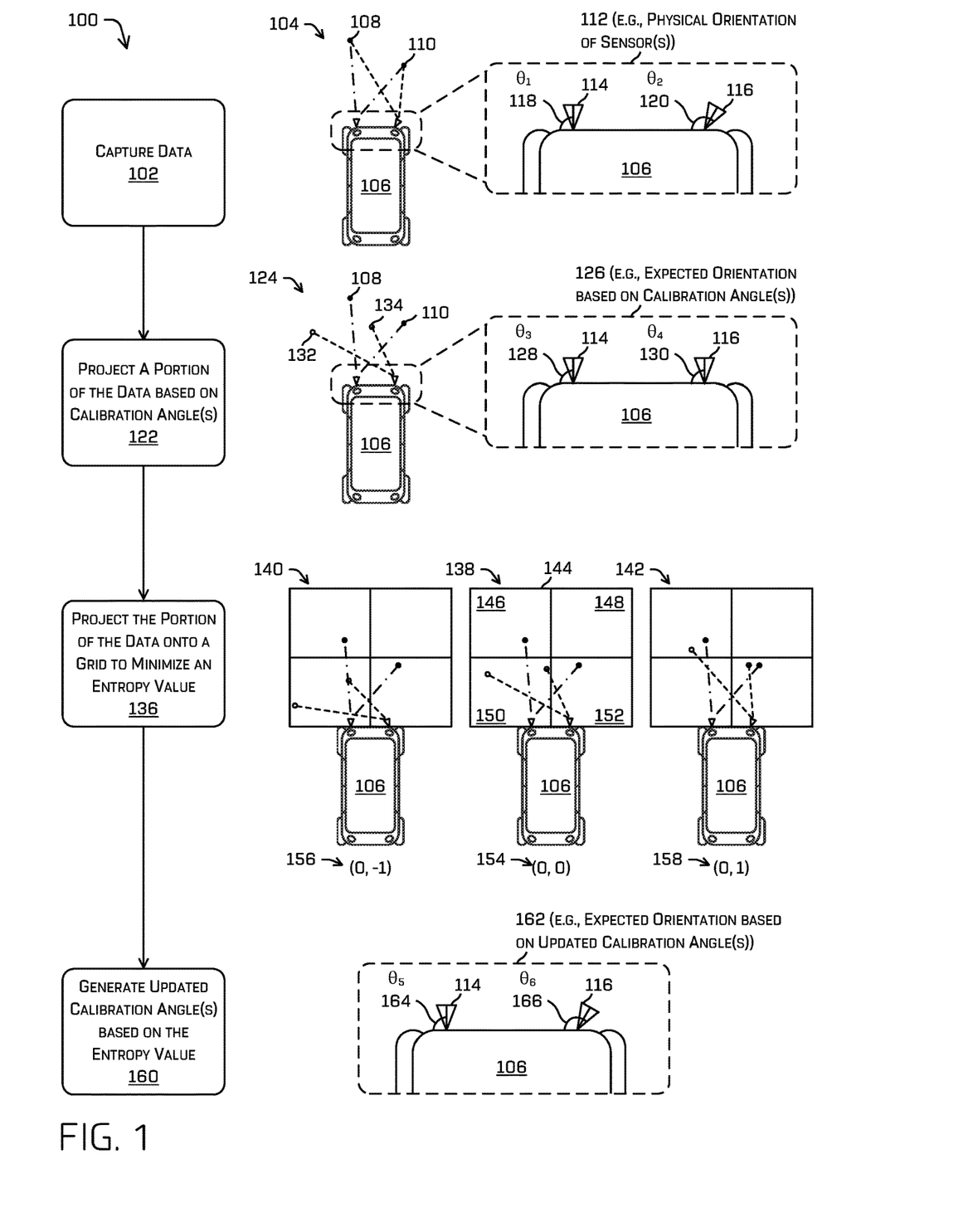
FIG. 1 depicts a pictorial flow diagram of an example process for calibrating sensors on an autonomous vehicle, in accordance with embodiments of the disclosure.

FIG. 1 depicts a pictorial flow diagram of an example process 100 for calibrating sensors disposed on an autonomous vehicle, in accordance with embodiments of the disclosure.

At operation 102, the process can include capturing data of an environment. In one example, the operation 102 can include capturing radar data from one or more radar sensors disposed on an autonomous vehicle. Of course, the process 100 is not limited to radar data or radar sensors, and any type and number of sensors can be used with the calibration techniques discussed herein. An example 104 illustrates a vehicle 106 capturing data of a first point 108 and a second point 110 in an environment. In some instances, the data captured in the operation 102 can include a position and/or velocity of an object relative to the position and/or velocity of the vehicle 106.

A detail view 112 illustrates a physical orientation of one or more sensors on the vehicle 106. For example, the vehicle 106 includes a first sensor 114 (e.g., a first radar sensor) and a second sensor 116 (e.g., a second radar sensor) disposed on the vehicle 106. In some instances, the first sensor 114 may be mounted at an angle $\theta_1$ 118 relative to the vehicle 106, while the second sensor 116 may be mounted at an angle $\theta_2$ 120 relative to the vehicle 106. As illustrated, the first sensor 114 can capture first data associated with the points 108 and 110 in the environment, while the second sensor 116 also can capture second data associated with the points 108 and 110.

At operation 122, the process can include projecting a portion of the data based on one or more calibration angles onto a task space (e.g., a reference space for projecting data), which is to say that data acquired from the sensors can be projected into an environment based on an assumption of the sensor extrinsics. In some instances, the operation 122 can include filtering out data corresponding to non-zero velocities, so the portion of the data to be projected in the operation 122 represents data corresponding to stationary objects. In some instances, the operation 122 can include selecting data associated with velocity values under a threshold velocity value. In some instances, the operation 122 can include selecting a region of interest, which is to say, the operation 122 can include selecting a portion of the sensor data for use in the calibration operations discussed herein. In some instances, the operation 122 can include selecting data corresponding to a distance traveled, particular maneuvers performed during the region of interest (e.g., a number of turn(s), a radius of turn(s), speed(s), start(s) and stop(s), etc.), and the like.

An example 124 illustrates the projection of data based on one or more initial calibration angles (e.g., the expected angles). As illustrated in a detail 126, an expected orientation based on the calibration angle(s) is represented by an angle $\theta_3$ 128 and an angle $\theta_4$ 130. In some instances, the calibration angle 128 for the first sensor 114 may correspond to the physical orientation of the first sensor 114 illustrated by the angle 118 (e.g., the angle $\theta_1$ 118 may substantially correspond to the angle $\theta_3$ 128). In such a case, the data captured by the first sensor 114 and projected in the operation 122 may accurately reflect a state of the environment. Accordingly, the first sensor 114 in the example 124 illustrates the sensor data correctly indicating the positions of the points 108 and 110.

However, as illustrated in the detail 126, the calibration angle 130 for the second sensor 116 may not correspond to the physical orientation (i.e., actual orientation) of the second sensor 116 illustrated by the angle 120 (e.g., the angle $\theta_2$ 120 may differ from the angle $\theta_4$ 130). In such a case, the data captured by the second sensor 116 and projected in the operation 122 may not accurately represent the state of the environment. As illustrated, the data captured by the second sensor 116 may be incorrectly interpreted as corresponding to data points 132 and 134.

As can be understood, in some instances, the operation 122 may be omitted from the calibration operations, and can be understood as illustrating a problem caused by miscalibrated sensors or incorrectly calibrated sensors.

At operation 136, the process can include projecting the portion of the data onto a grid to minimize an entropy value. In some examples, the operation 136 can include utilizing a combinatorial search algorithm to generate a plurality of projections representing an exhaustive or nearly exhaustive search across combinations of sensor calibrations to arrive at projection representing a lowest entropy value (and thereby representing an optimal calibration). In some instances, projecting the portion of the data onto a grid to minimize an entropy value can refer to an iterative process of determining an entropy value (or error/cost) associated with a particular projection and comparing the entropy value with a reference entropy value. In some instances, an absolute minimum entropy value can be determined, and in some instances, a lowest entropy value can be determined based on a level of precision utilized (e.g., a size of a projection grid, a step size of calibration angles to test, etc., as discussed herein).

Examples 138, 140, and 142 illustrate various instances of projections of captured data projected onto a grid 144. In some instances, the grid 144 can include a plurality of cells 146, 148, 150, and 152.

The example 138 represents a projection of sensor data captured by the first sensor and the second sensor based on the initial (expected) calibration angles discussed above in the detail 126. That is, the example 138 represents a baseline or reference projection of the sensor data, represented as an orientation 154 (0, 0).

The example 140 represents a projection of the sensor data captured by the first sensor and the second sensor based on an adjusted orientation 156 (0, −1). In some instances, the orientation 156 represents a projection whereby the data captured by the first sensor was not altered (e.g., represented by "0" in the orientation 156), while the data captured by the second sensor was rotated one unit to the counter-clockwise (e.g., represented by "−1" in the orientation 156). In some instances, the amount to rotate the data can be a tunable or selectable parameter, or can be based on a precision setting. For example, in some instances, the calibration operation can perform a "coarse" calibration followed by various levels of "fine" calibration to arrive at an optimal solution.

In some instances, the orientation 156 represents the data captured by the second sensor 116 with the sensor orientation rotated 20 degrees to counter-clockwise.

In some instances, the orientation 158 (0, 1) represents the data captured by the second sensor 116 rotated 20 degrees clockwise (e.g., in a yaw direction). For the sake of brevity not all possible combinations are illustrated in FIG. 1. However, additional details of a combinatorial search algorithm are discussed below in connection with FIG. 2. As will be discussed in detail below, while depicted in FIG. 1 for illustrative purposes, it is understood that such a projection may not be limited to one dimension (here a "yaw") and can include any number of dimensions (e.g. an x, y, z, roll, pitch, yaw, etc.) between any number of sensors.

With reference to the example 138, at least a portion of the sensor data captured by the first sensor and the second sensor data can be projected onto the grid 144 based at least in part on the orientation 154. As illustrated, two points of data captured by the second sensor 116 are projected into the cell 150. Further, a first point of data captured by the first sensor 114 is projected into the cell 146, while a second point of data captured by the first sensor 116 is projected into the cell 152.

After the portion of the data is projected onto the grid, an entropy value can be determined for each projection of the plurality of projections. For example, the operation 136 can include summing a number of measurements occupying each cell, from which a histogram (e.g., a two-dimensional spatial histogram) of each projection can be determined. In some instances, the histogram can be normalized to produce a probability distribution representing, at least in part, a probability that sensor data was projected into a particular cell based on the projection orientation. An entropy value can be determined based on the probability distribution.

As can be understood, an entropy value can be determined for and associated with each projection of the plurality of projections. Thus, as the combinatorial search algorithm can determine a plurality of projections and an entropy value can be determined for each projection, an optimal solution can be determined by selecting the projection associated with a lowest entropy value.

In some instances, the operation 136 can include determining a Shannon entropy. In some instances, the Shannon entropy can be determined according to the equation below:

$$H = -\Sigma_{i,j} p_{ij} \log_2 p_{ij} \quad (1)$$

Where $p_{ij}$ represents the probability that an individual data point of the data was observed at spatial coordinates (i, j).

In some instances, the operation 136 can include determining a Rényi entropy, a Hartley entropy, a collision entropy, a minimum entropy, and the like.

In some instances, the example 142 represents a lowest entropy value of the three projections illustrated in the examples 138, 140, and 142, as the example 142 represents the largest amount of points in the fewest number of cells. For example, the examples 138 and 140 represent four points (e.g., 108, 110, 132, and 134) in three cells (e.g., 146, 150, and 152), while the example 142 represents the four points (e.g., 108, 110, 132, and 134) in two cells (e.g., 146 and 152). Operation 136 may be repeated, reducing a step size (e.g., from 20 degrees to 10 degrees), as well as decreasing the area of each grid cell (e.g., increasing the number of cells), to produce finer and finer revisions to the estimated position and/or orientation of the sensors.

At operation 160, the process can include generating one or more updated calibration angles based at least in part on the entropy value. For example, the operation 160 can include determining the lowest entropy value determined in the operation 136 (e.g., corresponding to the example 142). In some instances, the operation 160 can include determining the orientation 158 of the sensors representing the calibration angles of the sensors to optimally calibrate the first sensor and the second sensor, for example. As discussed above, the orientation 158 (0, 1) represents the initial calibration angle associated with the first sensor (e.g., "0" of (0, 1)) and represents an updated calibration angle associated with the second sensor (e.g., "1" of (0, 1)). In some instances, the operation 160 can include identifying the precision of the combinatorial searching algorithm, which in this case, represents a 20-degree rotation clockwise.

In a detail 162, an expected orientation of the first sensor and the second sensor based on updated calibration angles is illustrated. For example, the first sensor 114 is associated with an updated calibration angle $\theta_5$ 164 and the second sensor 116 is associated with an updated calibration angle $\theta_6$ 166. Thus, the updated calibration data (e.g., the updated calibration angles 164 and 166) can be sent along with any data captured by the first sensor 114 and the second sensor 116, respectively, and/or can be stored in memory and accessed by any component to align the data between the first sensor 114 and the second sensor 116.

Figure 2:
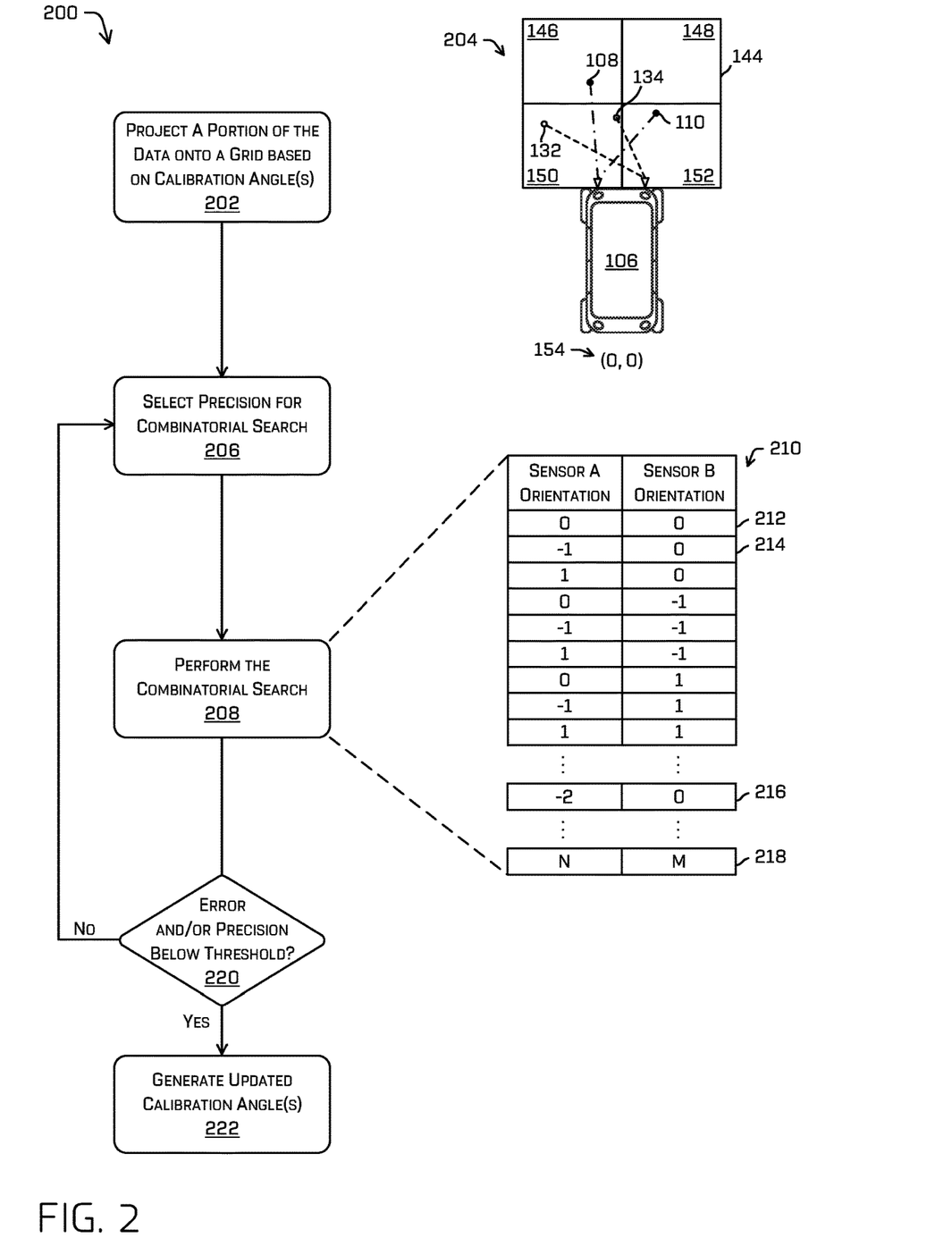
FIG. 2 depicts a pictorial flow diagram of an example process for using a combinatorial searching algorithm for calibrating sensors on an autonomous vehicle, in accordance with embodiments of the disclosure.

FIG. 2 depicts a pictorial flow diagram of an example process 200 for using a combinatorial searching algorithm for calibrating sensors on an autonomous vehicle, in accordance with embodiments of the disclosure.

At operation 202, the operation can include projecting a portion of the sensor data onto a grid based on estimated sensor poses (e.g., position and orientations). In some instances, the operation 202 can include removing data associated with a non-zero velocity from the data projected in the operation 202. That is, in some instances, the calibration operations can be performed using data representing stationary objects.

An example 204 illustrates the vehicle 106 projecting sensor data captured by a first sensor 114 and a second sensor 116 onto the grid 144 based on the orientation 154. As illustrated, data points 132 and 134 captured by the second sensor are projected into the cell 150 of the grid 144. The data point 108 captured by the first sensor is projected into the cell 146 of the grid 144, and the data point 110 captured by the second sensor is projected into the cell 152 of the grid 144.

As can be understood, the data to be projected in the operation 202 is not limited to a single instance or "snapshot" of data captured by the vehicle 106. Instead, the data to be projected can represent data captured by the vehicle 106 over any period of time or distances, any may represent any maneuvers of the vehicle 106, such as lane changes, left turns and right turns, etc. In some instances, the data to be projected in the operation 202 can be captured by the vehicle 106 and stored in a log file of the vehicle 106 for subsequent processing. In such examples, localization information about the vehicle (e.g., a position and/or orientation) may be determined and/or provided by, for example, a SLAM system, or the like. As will be appreciated, the more accurate the localization system is, the better the quality of calibration that can be performed by the techniques described herein. Furthermore, such multiple sensors may, in fact, represent a single sensor that has acquired data over time (e.g., each "sensor" may represent the same physical sensor at different times). In such an example, calibration would also determine the position and/or orientations of the single sensor relative to the vehicle itself.

In some instances, the grid 144 can represent discrete cells of any size. In one implementation, the cell 146 can represent an area on the order of 10 centimeters by 10 centimeters. In some examples, the grid 144 can include cells of any size or shape, and is not limited to the specific examples described herein. The total area of the grid 144 may range from tens of centimeters to thousands of meters, or more.

As discussed above, the example 204 represents a projection of the data based on the calibration angles (e.g., indicated by the orientation 154). In some instances, the convention (0, 0) indicates that the projection of the data in the example 204 is performed using the baseline calibration angles (e.g., which may correspond to previous or initial calibration data). Again, though depicted as an angle only (e.g., yaw) for illustrative purposes, such calibrations may be over any one or more of an x-position, y-position, or z-position, yaw, pitch roll, etc.

At operation 206, the process can include selecting a precision for a combinatorial search. For example, in some instances, the process 200 can perform a combinatorial search at different precisions such as "coarse," "medium," and "fine," to successively refine the calibration of the one or more sensors. In some instances, a single precision can be a tunable (or selectable) parameter. In some examples, the precision may be successively refined (e.g., linearly, exponentially, etc.) until some user defined threshold is met and/or exceeded (e.g., the threshold defined below in operation 220). By way of example, and without limitation, a first precision can be on the order of 20 degrees, although any value can be used. Using 20 degrees as an example of a "coarse" precision, a precision of 10 degrees and 1 degree can be used, respectively, for a "medium" and "fine" precision, although any values may be used.

At operation 208, the process can include performing the combinatorial search based at least in part on the selected precision. By way of example, and without limitation, an example 210 illustrates an example sequence representing a combinatorial search for calibrating two sensors. In some instances, the combinatorial search algorithm can exhaustively or nearly exhaustively search through all combinations of sensor orientations, project the data onto the grid for each orientation, and determine an entropy value (or other error value) for each projection. In some instances, the example 210 represents a plurality of poses of the first sensor and the second sensor including a combinatorial set of transformations across one or more dimensions.

A first entry 212 in the example 210 corresponds to the orientation 154. That is, the first entry 212 of the combinatorial search algorithm can include projecting the first sensor data and the second sensor data onto a grid based on the previous, initial, or most recent calibration information. In some instances, the first entry 212 of (0, 0) can correspond to a neutral orientation of the sensors (e.g., an angle 118 of 90 degrees and an angle 120 of 90 degrees).

A second entry 214 in the example 210 corresponds to an orientation (−1, 0). In an example where the search precision is 20 degrees, and wherein the first entry 212 corresponds to a neutral orientation (e.g., the first and second sensors at 90 degrees relative to the vehicle 106), the angle of the first sensor for the projection corresponding to the second entry 214 can correspond to 70 degrees, while the orientation for the second sensor can correspond to an angle of 90 degrees. As can be understood, the operation 208 can include determining a projection for each entry of the example 210. Further, the operation 208 can include determining an entropy value for each projection of the plurality of projections.

As illustrated in the example 210, the combinatorial search algorithm can include any number of sensor orientations. An example 216 illustrates an orientation of the Sensor A corresponding to "−2", which, continuing with the example discussed above, the angle of the first sensor for the projection corresponding to the second entry 214 can correspond to 50 degrees (e.g., 90 degrees minus 2*20 degrees). An example 218 illustrates that an arbitrary number of steps (e.g., N and M) can be used for determining projections.

In a case where three or more sensors are to be calibrated simultaneously, the combinatorial search algorithm can be expanded to accommodate any number of additional sensors and/or dimensions. That is, the calibration techniques discussed herein are not limited to calibrating one, two, or three sensors, and may be used for any number and/or type of sensors and any number of dimensions (position and/or orientation).

At operation 220, the process can include determining whether the error values determined in the combinatorial search and/or a precision of the search are below a threshold. For example, the combinatorial search may determine an entropy value for each projection of the plurality of projections. In some instances, the operation 220 can include determining the minimum entropy value representing a best calibration (e.g., based on a selected precision). If the error is not below a threshold (e.g., a lowest entropy and/or a change in error (as compared to a previous iteration, represented as "no" in the operation 220), the process can return to the operation 206 where an updated precision can be selected. For example, a first pass of the process can search at a first precision (e.g., a "coarse" precision), while successive passes can search at a finer precision. In some instances, the reference orientation (e.g., 0, 0) can be updated to reflect the position and/or orientation corresponding to the lowest entropy of the projections.

In some instances, in addition to or instead of changing the precision referring to a number of degrees associated with a sensor, the precision can refer to a size of the grid. For example, a size of the grid can decrease over successive passes to determine an optimal calibration.

If the error is below a threshold (e.g., "yes" in the operation 220), the process can continue to operation 222, which may include generating one or more calibration angles. That is, the operation 222 can include determining, based at least in part on the lowest entropy value determined in the operation 220, one or more calibration angles corresponding to the projection. For example, the angle at which data is projected in the corresponding lowest entropy can represent an orientation of the sensors relative to the vehicle. Thus, the calibration angles can be used to align data captured by the sensors to produce an aligned representation of the environment.

Figure 3A:
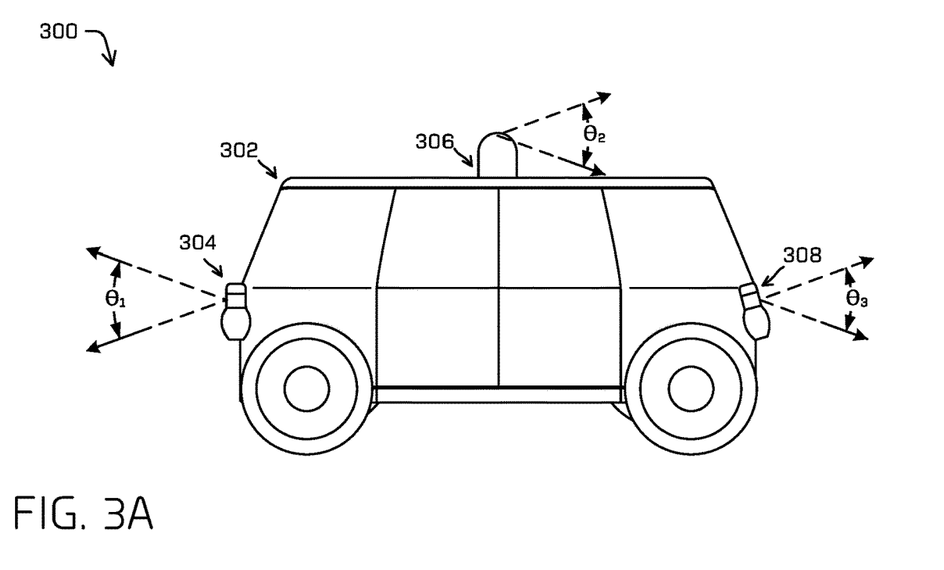
FIG. 3A depicts a side view of an example vehicle having multiple sensor assemblies mounted to the vehicle.

FIG. 3A depicts a side view 300 of an example vehicle 302 having multiple sensor assemblies mounted to the vehicle. In some instance, the sensor assemblies may include, but are not limited to, one or more LIDAR sensors, radar sensors, image sensors, SONAR sensors, and the like. Additional examples of sensors are discussed herein (e.g., in connection with FIG. 4).

As shown in the side view 300, the vehicle 302 may include any number of sensors in any combination or configuration. For example, the vehicle 302 includes at least sensors 304, 306, and 308. In some instances, the sensor 304 may comprise a radar sensor having a vertical field of view illustrated as $\Theta_1$. The sensor 306 may include a LIDAR sensor mounted on a roof of the vehicle, the sensor 306 having a vertical field of view illustrated as $\Theta_2$. In some instances, the sensor 308 may be mounted on the vehicle 302, with the sensor 308 having a vertical field of view $\Theta_3$. In some instances, the sensor 308 represents a radar sensor, LIDAR sensor, image sensor, SONAR sensor, and the like. Of course, any number and/or type of sensors can be mounted to or installed in the vehicle 302.

Figure 3B:
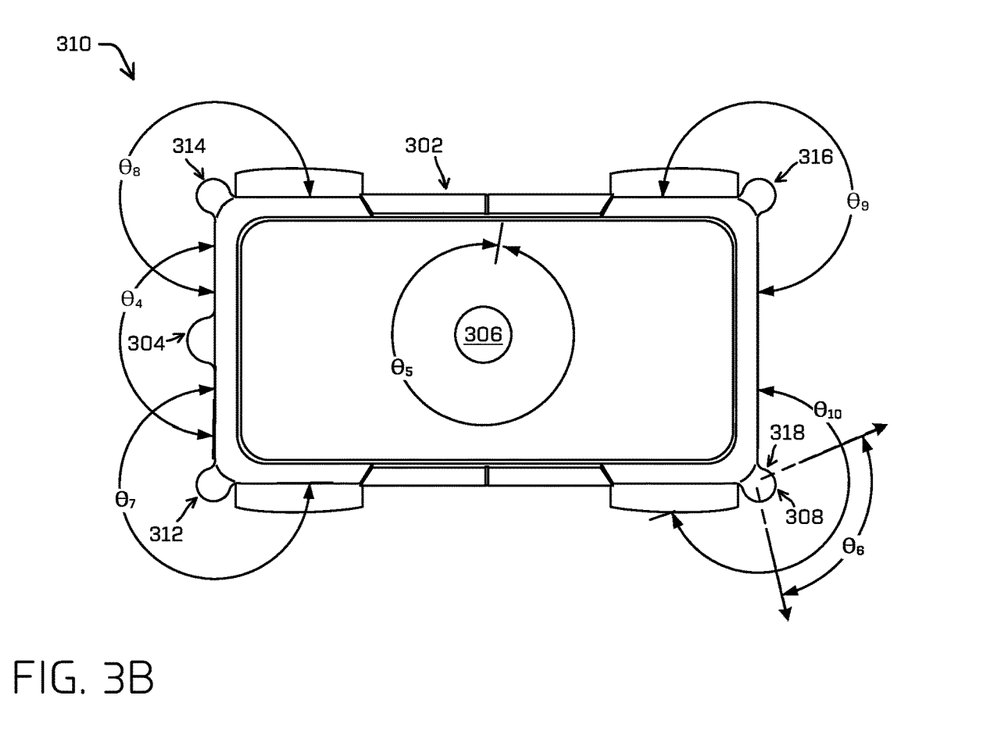
FIG. 3B depicts a top plan view of an example vehicle having multiple sensor assemblies mounted to the vehicle.

FIG. 3B depicts a top plan view 310 of the example vehicle 302 having multiple sensor assemblies mounted to the vehicle. For example, the sensors 304, 306, and 308 can be seen in FIG. 3B, as well as additional sensors 312, 314, 316, and 318. As may be understood in the context of this disclosure, the vehicle 302 may include any number and any type of sensors. As illustrated in FIG. 3B, the sensor 304 may include a horizontal field of view $\Theta_5$, the sensor 306 may include a horizontal field of view $\Theta_6$, the sensor 308 may include a horizontal field of view $\Theta_7$, and the sensor 310 may include a horizontal field of view $\Theta_8$. As may be understood in the context of this disclosure, the mounting locations and fields of view may correspond to extrinsic characteristics and intrinsic characteristics, respectfully, which may be calibrated as described herein. Further, as may be understood in the context of this disclosure, some of the sensors 304, 312, 314, and the like, may have overlapping fields of view (e.g., "co-visibility").

Figure 4:
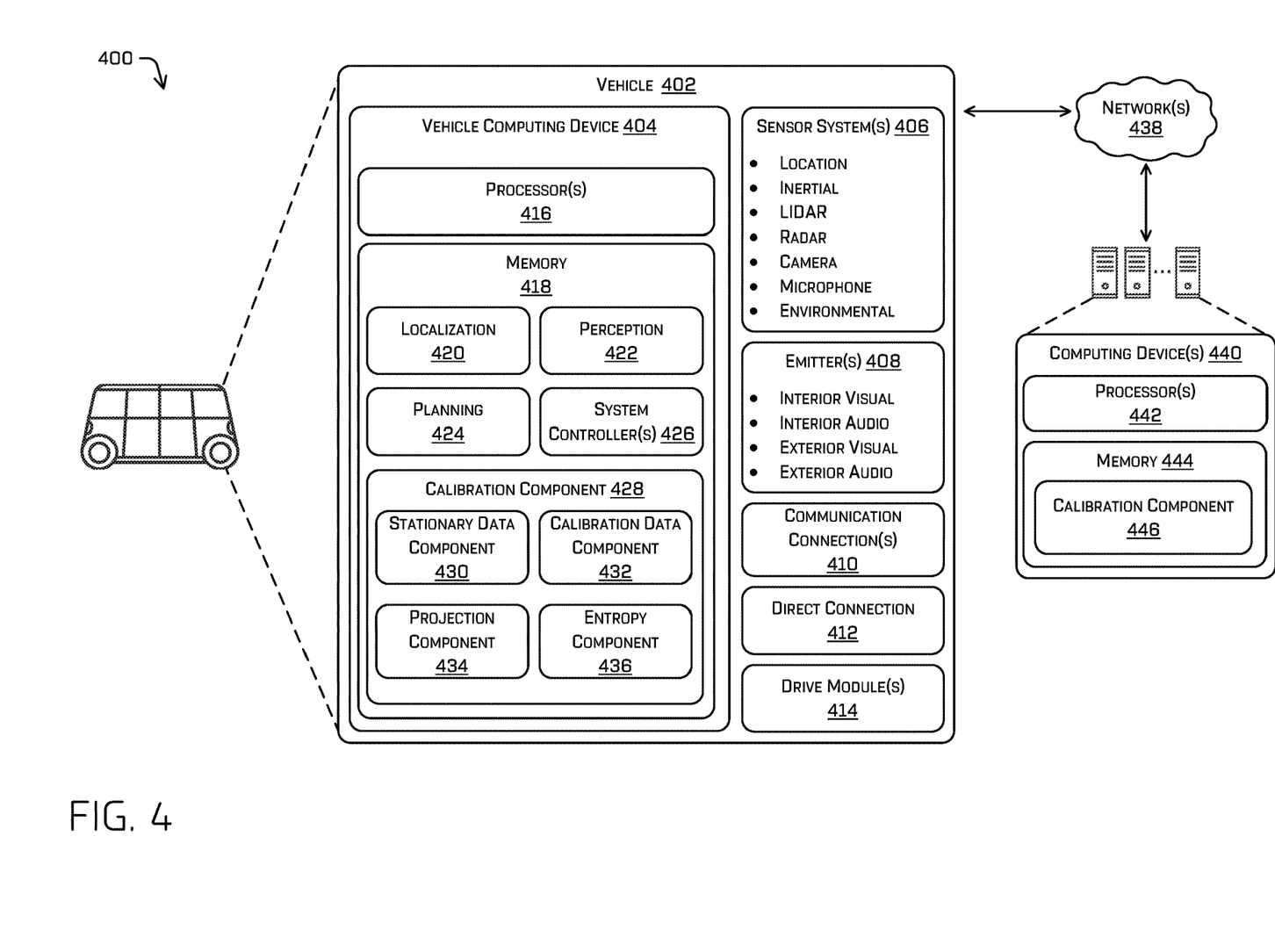
FIG. 4 depicts a block diagram of an example system for implementing the embodiments described herein.

FIG. 4 depicts a block diagram of an example system 400 for implementing the techniques described herein. In at least one example, the system 400 can include a vehicle 402, which can be the same vehicle as the vehicles 106 or 302 described above with reference to FIGS. 1 and 3.

The vehicle 402 can include a vehicle computing device 404, one or more sensor systems 406, one or more emitters 408, one or more communication connections 410, at least one direct connection 412, and one or more drive modules 414.

The vehicle computing device 404 can include one or more processors 416 and memory 418 communicatively coupled with the one or more processors 416. In the illustrated example, the vehicle 402 is an autonomous vehicle; however, the vehicle 402 can be any other type of vehicle. In the illustrated example, the memory 418 of the vehicle computing device 404 stores a localization component 420, a perception component 422, a planning component 424, one or more system controllers 426, and a calibration component 428. Further, the calibration component 428 can include a stationary data component 430, a calibration data component 432, a projection component 434, and an entropy component 436. Though depicted in FIG. 4 as residing in memory 418 for illustrative purposes, it is contemplated that the calibration component 428 may additionally, or alternatively, be accessible to the vehicle 402 (e.g., stored remotely).

In at least one example, the localization component 420 can include functionality to receive data from the sensor system(s) 406 to determine a position of the vehicle 402. For example, the localization component 420 can include, request, and/or receive a three-dimensional map of an environment and can continuously determine a location of the autonomous vehicle within the map. In some instances, the localization component 420 can utilize SLAM (simultaneous localization and mapping) or CLAMS (calibration, localization and mapping, simultaneously) to receive image data, LIDAR data, radar data, SONAR data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a candidate trajectory, or for correlating calibration operations, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, unknown, etc.). In additional and/or alternative examples, the perception component 422 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (e.g., size), etc. Characteristics associated with the environment can include, but are not limited to, a presence of another entity in the environment, a state of another entity in the environment, a time of day, a day of a week, a season, a weather condition, an indication of darkness/light, etc.

In at least one example, the vehicle computing device 404 can include one or more system controllers 426, which can be configured to control steering, propulsion, braking, safety, emitters, communication, and other systems of the vehicle 402. These system controller(s) 426 can communicate with and/or control corresponding systems of the drive module(s) 414 and/or other components of the vehicle 402.

In general, the planning component 424 can determine a path for the vehicle 402 to follow to traverse through an environment. For example, the planning component 424 can determine various routes and trajectories and various levels of detail. For example, the planning component 424 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique.

In general, the calibration component 428 can include functionality to calibrate one or more sensors operating in connection with the vehicle 402. For example, the calibration component 428 can detect miscalibrated sensors, schedule calibration routines, and send calibration data to one or more other components of the vehicle 402 that utilize data produced by the one or more sensors.

The stationary data component 430 can include functionality to receive sensor data captured by one or more sensors of the sensor system(s) 406 to identify data representing stationary objects. That is, in some instances, such as when calibrating one or more radar sensors, the sensor data may indicate a relative velocity of an object in an environment. Thus, the stationary data component 430 can receive data associated with the velocity of the vehicle 402 (e.g., from a wheel encoder, GPS sensor, and the like) to determine a velocity of the vehicle 402 relative to a data of objects represented in the sensor data. In some instances, the stationary data component 430 can include a threshold value setting a velocity above which data can be discarded (or omitted or ignored for calibration purposes). In some instances, the threshold value can be a zero velocity, and in some instances, the threshold value can be a non-zero value (e.g., data can be associated with a velocity below the threshold value).

In some instances, the stationary data component 430 can receive data from a map or other source identifying stationary objects in an environment, such as a building, pole, tree, or the like. In some instances, the stationary data component 430 can associated sensor data with one or more stationary objects to determine whether a stationary object (based on map data) is represented as having a velocity value in sensor data. In such a case, the calibration component 428 can determine that a sensor may be miscalibrated, and generate an indication that a calibration should be performed.

The calibration data component 432 can include functionality to store calibration data associated with one or more sensors of the vehicle 402. In some instances, the calibration data component 432 can store one or more calibration angles (or calibration characteristics, generally) associated with a sensor, such as the angles 118, 120, 128, 130, 164, and 166 discussed above with respect to FIG. 1. In some instances, the calibration data can store mounting angles and/or positions of sensors and/or any extrinsic and/or intrinsic information associated with the one or more sensors, including but not limited to, calibration angles, mounting location, height, direction, yaw, tilt, pan, timing information, lens distortion parameters, transmission medium parameters, and the like. Further, the calibration data component 432 can store a log of some or all of the calibration operations performed, such as a time elapsed from the most recent calibration, and the like.

The projection component 434 can include functionality to project sensor data onto a grid for calibrating one or more sensors of the sensor system(s) 406. In some examples, the projection component 434 can utilize a combinatorial search algorithm to project the sensor data as a plurality of projections to exhaustively or nearly exhaustively search for an optimal sensor calibration. In some instances, the projection component 434 can select a size of a grid. As discussed above, one example of a grid size is on the order of 10 centimeters by 10 centimeters, although any dimensions may be used. In some instances, a size of the grid can be fixed throughout a calibration process, while in some instances, a size of the grid can be varied (e.g., enlarged or reduced) to converge at an optimal calibration solution.

After determining a grid, the projection component 434 can project sensor data onto the grid. In some instances, the projection component 434 can generate a histogram (e.g., a two-dimensional spatial histogram) representing a count of a number of data points represented in each cell of the grid. In some instances, the projection component 434 can normalize the histogram to determine a probability distribution of data points in each of the cells.

The entropy component 436 can include functionality to receive the probability distribution generated by the projection component 434 to determine an entropy value of each projection of the plurality of projections. For example, the entropy component 436 can determine a Shannon entropy, a Rényi entropy, a Hartley entropy, a collision entropy, a minimum entropy, and the like.

In some instances, the projection component 434 and/or the entropy component 436 can perform operations in parallel. For example, individual projections (and/or entropy calculations) can be determined in parallel using a processor, such as a GPU, to reduce an amount of processing time for the calibration operations discussed herein.

In some instances, as an alternative to a combinatorial search algorithm, calibration component 428 can utilize a gradient descent algorithm to evaluate a cost associated with one or more projections to determine an optimal calibration.

In some instances, aspects of some or all of the components discussed herein may include any models, algorithms, and/or machine learning algorithms. For example, in some instances, the components in the memory 418 (and the memory 444, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 406 can include LIDAR sensors, radar sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the LIDAR sensors (and/or radar sensors) can include individual LIDAR sensors (or radar sensors) located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally or alternatively, the sensor system(s) 406 can send sensor data, via the one or more networks 438, to the one or more computing device(s) at a particular frequency, after a lapse of a predetermined period of time, in near real-time, etc.

The vehicle 402 can also include one or more emitters 408 for emitting light and/or sound, as described above. The emitters 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive module(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device 404 to another computing device or a network, such as network(s) 438. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include one or more drive modules 414. In some examples, the vehicle 402 can have a single drive module 414. In at least one example, if the vehicle 402 has multiple drive modules 414, individual drive modules 414 can be positioned on opposite ends of the vehicle 402 (e.g., the front and the rear, etc.). In at least one example, the drive module(s) 414 can include one or more sensor systems to detect conditions of the drive module(s) 414 and/or the surroundings of the vehicle 402. By way of example and not limitation, the sensor system(s) 406 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 414. In some cases, the sensor system(s) on the drive module(s) 414 can overlap or supplement corresponding systems of the vehicle 402 (e.g., sensor system(s) 406).

The drive module(s) 414 can include many of the vehicle systems, including a high voltage battery, a motor to propel the vehicle 402, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 414. Furthermore, the drive module(s) 414 also include one or more communication connection(s) that enable communication by the respective drive module with one or more other local or remote computing device(s).

The processor(s) 416 of the vehicle 402 can be any suitable processor capable of executing instructions to process data and perform operations as described herein. By way of example and not limitation, the processor(s) 416 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 is an example of non-transitory computer-readable media. The memory 418 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with remote computing devices accessible via the network(s) 438.

For example, the vehicle 402 can send sensor data to one or more computing device(s) 440, via the network(s) 438. In some examples, the vehicle 402 can send raw sensor data to the computing device(s) 440. In other examples, the vehicle 402 can send processed sensor data and/or representations of sensor data to the computing device(s) 440. In some examples, the vehicle 402 can send sensor data to the computing device(s) 440 at a particular frequency, after a lapse of a predetermined period of time, in near real-time, etc. In some cases, the vehicle 402 can send sensor data (raw or processed) to the computing device(s) 440 as one or more log files.

The computing device(s) 440 can receive the sensor data (raw or processed) and can perform calibration operations on the data. In at least one example, the computing device(s) 440 can include one or more processors 442 and memory 444 communicatively coupled with the one or more processors 442. In the illustrated example, the memory 444 of the computing device(s) 440 stores a calibration component 446, which can include functionality to perform operations similar to those discussed above in the context of the calibration component 428. In some instances, the processor(s) 442 and the memory 444 can include functionality and/or structure similar to that discussed above with respect to the processor(s) 416 and the memory 418.

FIGS. 1, 2, 5, and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
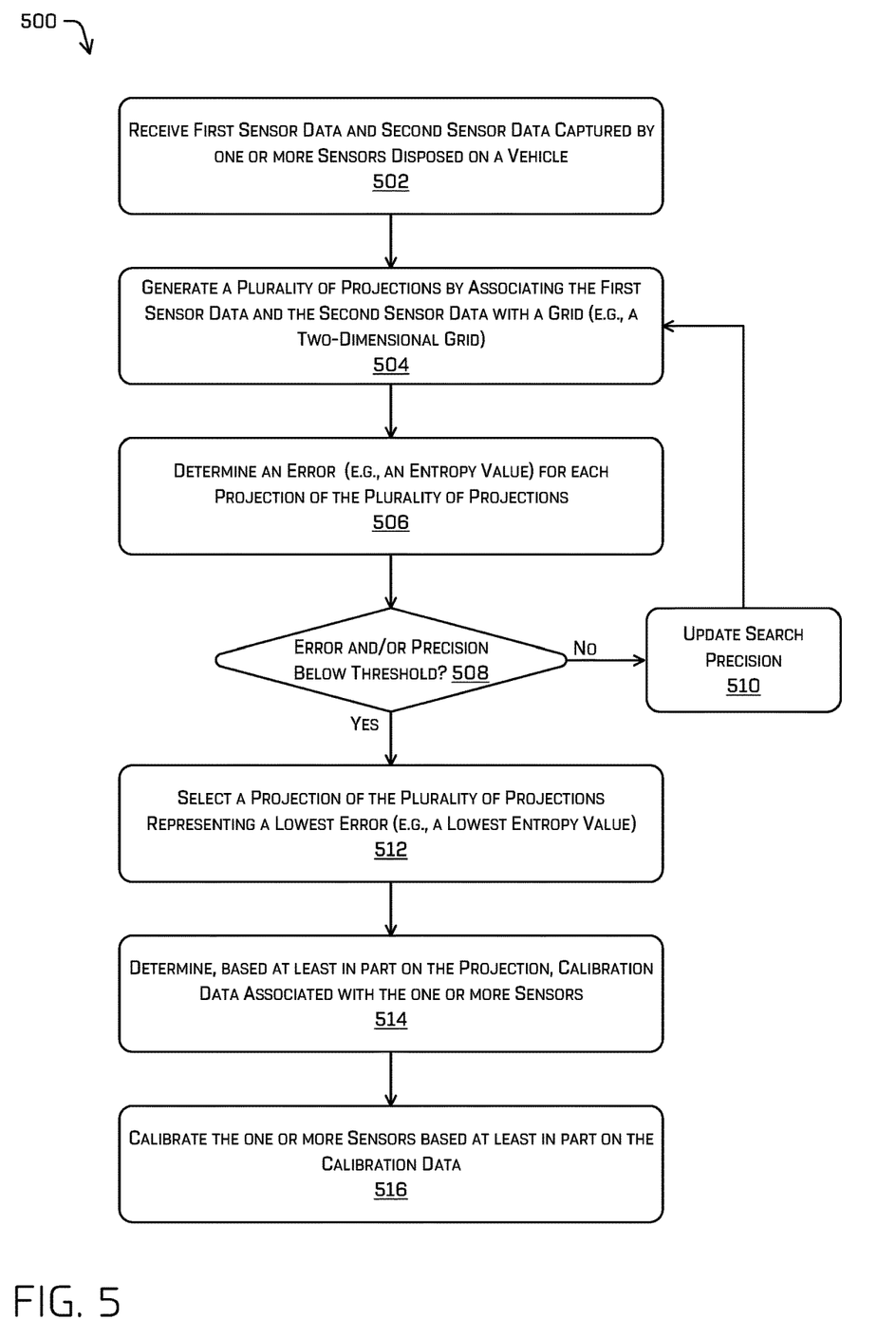
FIG. 5 depicts an example process for calibrating one or more sensors by projecting sensor data onto a grid to minimize an error such as an entropy value, in accordance with embodiments of the disclosure.

FIG. 5 depicts an example process 500 for calibrating one or more sensors by projecting sensor data onto a grid to minimize an error such as an entropy value, as discussed herein. For example, some or all of the process 500 can be performed by one or more components in FIG. 4, as described herein. For example, some or all of the process 500 can be performed by the calibration components 428 and/or 446.

At operation 502, the process can include receiving first sensor data and second sensor data captured by one or more sensors disposed on a vehicle. In the context of a single sensor, the first sensor data and the second sensor data can represent data acquired as the sensor moves through the environment. In some examples, such data may represent multiple passes of the vehicle through the same environment. For example, the first sensor data can represent data captured in the environment at a first time, which the second sensor data can represent data captured in the environment at a second time.

In the context of a plurality of sensors, the operation 502 can include receiving at least the first sensor data and the second sensor data from a first sensor and second sensor. In some instances, the first sensor data can be captured substantially simultaneously with the second sensor data (e.g., within technical tolerances and/or within an amount of time which would not impact the calibration technique described herein). In some instances, at least a portion of the first sensor data can represent a same environment as at least a portion of the second sensor data. In some instances, the operation 502 can include receiving localization information, for example, which may provide information about a pose (e.g., position and/or orientation) of the vehicle. In some instances, the localization information may be provided by a CLAMS (calibration, localization, and mapping, simultaneously) system. Additionally, velocities (linear and/or angular), accelerations (linear and/or angular), etc. may also be provided by one or more systems and/or sensors.

At operation 504, the process can include generating a plurality of projections by projecting the first sensor data and the second sensor data onto a grid (e.g., a two- or three-dimensional grid). In some instances, the operation 504 can include selecting a combinatorial search algorithm to generate an exhaustive or nearly exhaustive set of possible projections of the sensor data. For example, the operation 504 can include projecting the first data and the second data in accordance with a combinatorial search table (e.g., as illustrated in the example 210). In some instances, the plurality of projections can represent different positions and/or orientations (e.g., poses) of the one or more sensors relative to each other and/or relative to the vehicle.

In some instances, the operation 504 can include determining a histogram, such as a two-dimensional spatial histogram, representing the projection of sensor data for each projection of the plurality of projections. In some instance, the histogram can represent, at least in part, a number of data points that were projected into each cell of the grid. In some instances, the operation 504 can include normalizing the histogram to determine a probability distribution over the projection.

At operation 506, the process can include determining an error (e.g., an entropy value) for each projection of the plurality of projections. In some instances, the operation 506 can include determining an entropy value for each probability distribution associated with individual projections of the plurality of projections. In some instances, the operation 506 can include determining a Shannon entropy, a Rényi entropy, a Hartley entropy, a collision entropy, a minimum entropy, and the like. In some instances, the operation 506 can include utilizing a gradient descent algorithm to determine an error associated with each projection.

At operation 508, the process can include determining whether the error (e.g. the lowest entropy) and/or a change in error (as compared to a previous iteration or reference value) is below a threshold. In some instances, the operation 508 can include determining a lowest entropy value of the plurality of entropy values determining in the operation 506 (which, in some cases, can represent an optimal calibration of the one or more sensors or a best fit based on the search algorithm and/or search precision). In some instances, the threshold can be selected based on a type of sensor, a number of sensors, conditions of an environment, ambient temperature, device temperature, and the like. In some instances, the threshold can be based in part on an entropy value determined by a previous calibration operation.

If the error (or change in error) is not below the threshold value (e.g., "no" in the operation 508), the process can continue to operation 510, which can include updating a search precision.

In some instances, the operation 510 can include updating a search precision (e.g., evaluating a combinatorial search algorithm on angles of 20 degrees, 15 degrees, 5 degrees, 1 degrees, and the like) and/or based on grid size (e.g., cells having dimensions of 10 cm by 10 cm, 5 cm by 5 cm, 1 cm by 1 cm, and the like). Additional examples are detailed with respect to FIG. 2, above. Of course, any values can be used and the examples listed are not intended to be limiting.

After the search precision has been updated in the operation 510, the process can return to the operation 504 to project the sensor data onto a grid to generate a plurality of projections.

If the error is below a threshold (e.g., "yes" in the operation 508), the process proceeds to operation 512.

At operation 512, the process can include selecting a projection of the plurality of projections representing a lowest error (e.g., a lowest entropy value).

At operation 514, the process can include determining, based at least in part on the projection, calibration data associated with the one or more sensors. For example, as discussed above in connection with FIG. 1, the example 142 may represent a lowest entropy value of the plurality of projections. The example 142 is associated with the orientation 158, which represents an adjustment from a reference orientation which resulted in the optimal calibration. In some instances, the operation 514 can include determining one or more calibration angles (or calibration characteristics, generally), for example, by adding or subtracting an adjustment angle from a reference angle to determine the optimal calibration data.

At operation 516, the process can include calibrating the one or more sensors based at least in part on the calibration data. For example, the operation 516 can include sending the calibration data to one or more of a localization system (e.g., the localization component 420), a perception system (e.g., the perception component 422), and the like. In some instances, the calibration data can be used by one or more systems of the vehicle to align or otherwise adjust data captured by the one or more sensors so that the data can represent the environment in an accurate manner.

Figure 6:
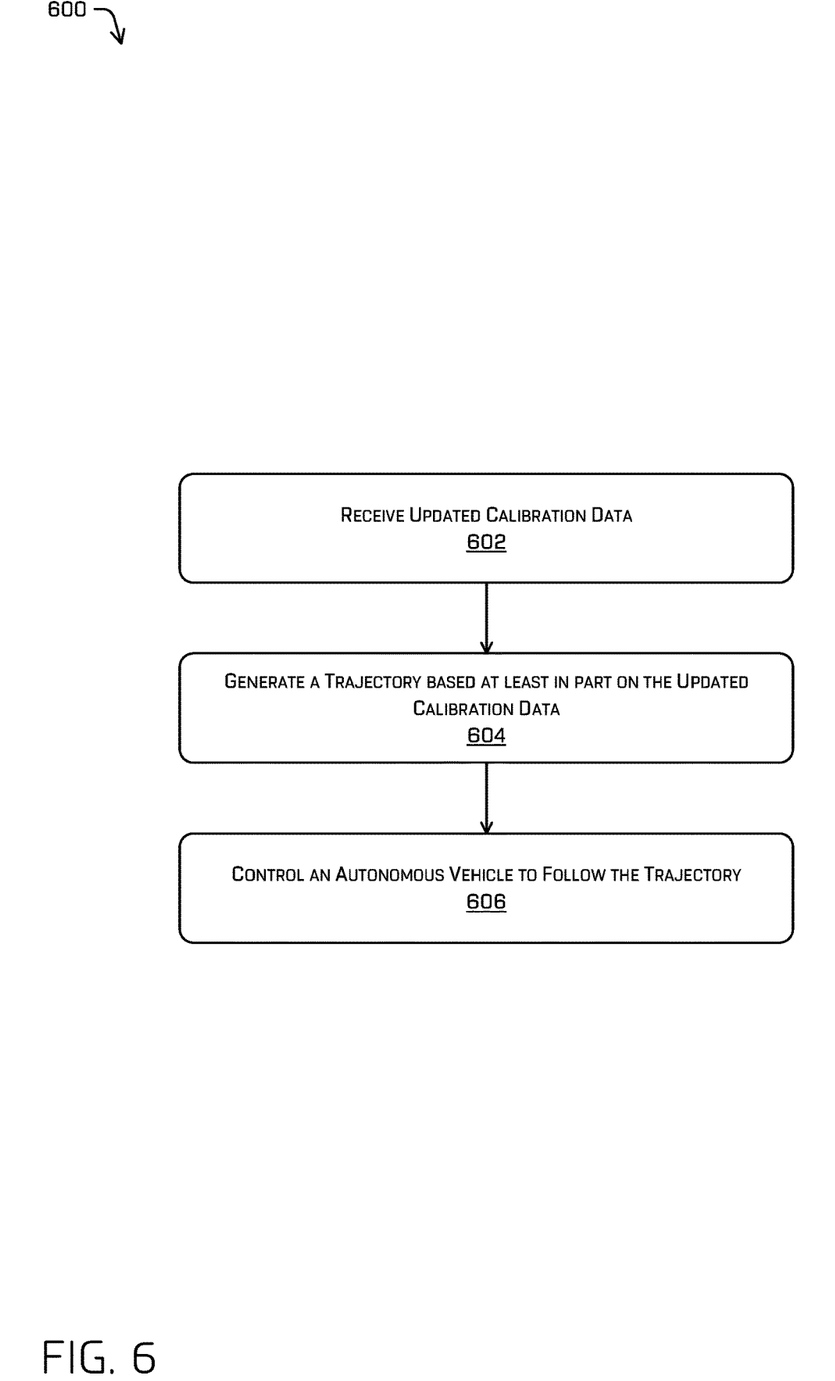
FIG. 6 depicts an example process for controlling an autonomous vehicle based at least in part on calibrated sensor data, in accordance with embodiments of the disclosure.

FIG. 6 depicts an example process 600 for controlling an autonomous vehicle based at least in part on calibrated sensor data, as discussed herein. For example, some or all of the process 600 can be performed by one or more components in FIG. 4, as described herein. For example, some or all of the process 600 can be performed by the localization component 420, the perception component 422, the planning component 424, and/or the one or more system controllers 426.

At operation 602, the process can include receiving updated calibration data. In some instances, the calibration data can be determined using the calibration techniques discussed herein.

At operation 604, the process can include generating a trajectory based at least in part on the updated calibration data. For example, the trajectory generated in the operation 604 may be based at least in part on sensor data received from one or more sensors calibrated using the calibration data. In some instances, the trajectory can be based on a presence of objects or agents external to an autonomous vehicle in an environment.

At operation 606, the process can include controlling an autonomous vehicle to follow the trajectory. In some instances, the commands generated in the operation 606 can be relayed to a controller onboard an autonomous vehicle to control the autonomous vehicle to drive the trajectory. Although discussed in the context of an autonomous vehicle, the process 600, and the techniques and systems described herein, can be applied to a variety systems utilizing machine vision.

Example Clauses

A. A system comprising: one or more processors; and one or more computer-readable media storing instructions executable by the one or more processors, wherein the instructions cause the system to perform operations comprising: receiving first sensor data captured by a first radar sensor disposed on an autonomous vehicle; receiving second sensor data captured by a second radar sensor disposed on the autonomous vehicle; projecting, based at least in part on a plurality of orientations of the first radar sensor and the second radar sensor, a first portion of the first sensor data and a second portion of the second sensor data with a two-dimensional grid as a plurality of projected data; determining, based at least in part on the plurality of projected data, an entropy; determining, based at least in part on the entropy, a first calibration angle associated with the first sensor; determining, based at least in part on the entropy, a second calibration angle associated with the second sensor; calibrating, based at least in part on the first calibration angle, the first radar sensor as a calibrated first radar sensor;

calibrating, based at least in part on the second calibration angle, the second radar sensor as a calibrated second radar sensor; generating, based at least in part on the calibrated first radar sensor and the calibrated second radar sensor, a trajectory to control the autonomous vehicle; and controlling the autonomous vehicle to follow the trajectory.

B: The system of paragraph A, wherein determining the entropy comprises: determining a plurality of first entropy values based at least in part on a subset of the plurality of projected data; determining that a first entropy value of the plurality of first entropy values meets or exceeds a threshold value; reducing a search precision; associating, based at least in part on the search precision and a plurality of second orientations of the first radar sensor and the second radar sensor, the first portion of the first sensor data and the second portion of the second sensor data with the two-dimensional grid as a second plurality of projected data; determining a plurality of second entropy values based at least in part on a subset of the second plurality of projected data; and determining, as the entropy, a second entropy value of the plurality of second entropy values.

C: The system of paragraph A or B, wherein the plurality of orientations comprises a combinatorial set of orientations of the first radar sensor and the second radar sensor in each of a clockwise rotation, counterclockwise rotation, and neutral rotation.

D: The system of any of paragraphs A-C, wherein the instructions, when executed by the one or more processors, further cause the system to perform operations comprising: determining, based on the plurality of projected data, a plurality of probability distributions, wherein determining the entropy is based at least in part on the plurality of probability distributions.

E: The system of any of paragraphs A-D, wherein the instructions, when executed by the one or more processors, further cause the system to perform operations comprising: determining that the first portion of the first sensor data represents first stationary data; and determining that the second portion of the second sensor data represents second stationary data.

F: A method comprising: receiving first sensor data captured by a first sensor; receiving second sensor data captured by a second sensor; associating, based at least in part on a plurality of poses of the first sensor and the second sensor, the first sensor data and the second sensor data with a grid, as a plurality of projected data; determining, based at least in part on the plurality of projected data, an entropy; determining, based at least in part on the entropy, first calibration data associated with the first sensor; determining, based at least in part on the entropy, second calibration data associated the second sensor; calibrating the first sensor based at least in part on the first calibration data; and calibrating the second sensor based at least in part on the second calibration data.

G: The method of paragraph F, wherein the plurality of poses comprises a combinatorial set of pose transformations across one or more dimensions.

H: The method of paragraph G, wherein: the grid is a two-dimensional grid; the combinatorial set of pose transformations comprise yaw rotations; the first sensor is a first radar sensor having a first field of view; the second sensor is a second radar sensor having a second field of view; and the first field of view at least partially overlaps the second field of view.

I: The method of any of paragraphs F-H, wherein the plurality of projected data is a first plurality of projected data based at least in part on a first search precision, and wherein the entropy is a first entropy value, the method further comprising: determining that the first entropy value meets or exceeds a threshold entropy value; selecting a second search precision associated with a second grid; associating, based at least in part on the second search precision and a plurality of second poses of the first sensor and the second sensor, the first sensor data and the second sensor data with the second grid, as a second plurality of projected data; and determining, as the entropy, a second entropy value associated with the second plurality of projected data.

J: The method of paragraph I, wherein a first cell size of the first search precision differs from a second cell size of the second search precision, and further wherein the first plurality of poses differs from the second plurality of poses.

K: The method of any of paragraphs F-J, wherein determining the entropy comprises determining a Shannon entropy of a subset of the plurality of projected data.

L: The method of any of paragraphs F-K, wherein the plurality of projected data is determined substantially simultaneously.

M: The method of any of paragraphs F-L, further comprising: receiving, based at least in part on the first calibration data, first calibrated sensor data captured by the first sensor; receiving, based at least in part on the second calibration data, second calibrated sensor data captured by the second sensor; generating, based at least in part on first calibrated sensor data and the second calibrated sensor data, a trajectory for an autonomous vehicle to follow; and causing the autonomous vehicle to follow the trajectory.

N: The method of any of paragraphs F-M, wherein the first sensor and the second sensor correspond to a single physical sensor, and further wherein the first sensor data comprises data acquired from the single physical sensor at a first time and the second sensor data comprises data acquired from the single physical sensor at a second time.

O: The method of any of paragraphs F-N, wherein at least a portion the first sensor data and a portion of the second sensor data correspond to a same portion of an environment.

P: A non-transitory computer-readable medium storing instructions that, when executed, cause one or more processors to perform operations comprising: receiving first sensor data captured by a first sensor; receiving second sensor data captured by a second sensor; associating, based at least in part on a plurality of poses of the first sensor and the second sensor, the first sensor data and the second sensor data with a grid, as a plurality of projected data; determining, based at least in part on the plurality of projected data, an entropy; determining, based at least in part on the entropy, first calibration data associated with the first sensor; determining, based at least in part on the entropy, second calibration data associated the second sensor; calibrating the first sensor based at least in part on the first calibration data; and calibrating the second sensor based at least in part on the second calibration data.

Q: The non-transitory computer-readable medium of paragraph P, wherein the plurality of poses comprises a combinatorial set of pose transformations in at least one dimension.

R: The non-transitory computer-readable medium of paragraph P or Q, wherein the grid includes a plurality of cells, the operations further comprising: determining that the entropy meets or exceeds a threshold; altering a search precision; determining, based at least on the search precision, a second plurality of poses; associating, based at least in part on second plurality of poses, the first sensor data and the second sensor data with the grid, as a second plurality of projected data; determining a plurality of second entropy values associated with the second plurality of projected data; and determining, as the entropy, a second entropy value of the plurality of second entropy values.

S: The non-transitory computer-readable medium of any of paragraphs P-R, the operations further comprising: receiving, based at least in part on the first calibration data, first calibrated sensor data captured by the first sensor; receiving, based at least in part on the second calibration data, second calibrated sensor data captured by the second sensor; generating, based at least in part on the first calibrated sensor data and the second calibrated sensor data, a trajectory for an autonomous vehicle to follow; and causing the autonomous vehicle to follow the trajectory.

T: The non-transitory computer-readable medium of any of paragraphs P-S, wherein determining the entropy comprises determining a Shannon entropy associated with at least a portion of the plurality of projected data.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving first sensor data captured by a first sensor;
receiving second sensor data captured by a second sensor;
associating, based at least in part on a first orientation of the first sensor and a second orientation of the second sensor, the first sensor data and the second sensor data with a grid comprising a plurality of cells, wherein a size of a cell of the plurality of cells is based on a search precision for determining calibration data;
determining, based at least in part on the associating the first sensor data and the second sensor data with the grid, a calibration error;
determining, based at least in part on the calibration error, at least one of first calibration data associated with the first sensor or second calibration data associated with the second sensor; and calibrating at least one of the first sensor based at least in part on the first calibration data or the second sensor based at least in part on the second calibration data.

2. The method of claim 1, wherein:
the first orientation and the second orientation represent a pose of plurality of poses; and
the plurality of poses comprises a combinatorial set of pose transformations across one or more dimensions.

3. The method of claim 1, wherein:
the first sensor is a first radar sensor associated with a first field of view;
the second sensor is a second radar sensor associated with a second field of view; and
the first field of view at least partially overlaps the second field of view.

4. The method of claim 1, wherein:
the calibration error is a first calibration error associated with a first search precision;
the grid is a first grid; and
the method further comprises:
determining that the first calibration error meets or exceeds a threshold error value;
determining a second search precision associated with a second grid;
associating, based at least in part on a third orientation of the first sensor and a fourth orientation of the second sensor, the first sensor data and the second sensor data with the second grid; and
determining a second calibration error.

5. The method of claim 4, wherein:
a first cell size of the first search precision differs from a second cell size of the second search precision, and
at least one of:
the first orientation is different than the third orientation; or
the second orientation is different than the fourth orientation.

6. The method of claim 1, wherein the first orientation is associated with a yaw rotation of the first sensor.

7. The method of claim 1, wherein calibrating the at least one of the first sensor based at least in part on the first calibration data or the second sensor based at least in part on the second calibration data comprises calibrating the first sensor based at least in part on the first calibration data, the method further comprising:
receiving, based at least in part on the first calibration data, first calibrated sensor data captured by the first sensor;
generating, based at least in part on first calibrated sensor data, a trajectory for an autonomous vehicle to follow; and
controlling the autonomous vehicle based at least in part on the trajectory.

8. The method of claim 1, wherein:
the first sensor and the second sensor correspond to a single physical sensor; and
the first sensor data comprises data acquired from the single physical sensor at a first time and the second sensor data comprises data acquired from the single physical sensor at a second time.

9. The method of claim 1, wherein at least a portion the first sensor data and a portion of the second sensor data correspond to a same portion of an environment.

10. The method of claim 1, further comprising:
determining that a first portion of the first sensor data represents stationary data; and determining the calibration error further based at least in part on the stationary data.

11. One or more non-transitory computer-readable media storing instructions that, when executed, cause one or more processors to perform operations comprising:
receiving first sensor data captured by a first sensor;
receiving second sensor data captured by a second sensor;
associating, based at least in part on a first orientation of the first sensor and a second orientation of the second sensor, the first sensor data and the second sensor data with a grid comprising a plurality of cells, wherein a size of a cell of the plurality of cells is based on a search precision for determining calibration data;
determining, based at least in part on the associating the first sensor data and the second sensor data with the grid, a calibration error;
determining, based at least in part on the calibration error, at least one of first calibration data associated with the first sensor or second calibration data associated with the second sensor; and
calibrating at least one of the first sensor based at least in part on the first calibration data or the second sensor based at least in part on the second calibration data.

12. The one or more non-transitory computer-readable media of claim 11, wherein:
the first orientation and the second orientation represent a pose of plurality of poses; and
the plurality of poses comprises a combinatorial set of pose transformations across one or more dimensions.

13. The one or more non-transitory computer-readable media of claim 11, wherein:
the calibration error is a first calibration error associated with a first search precision;
the grid is a first grid; and
the operations further comprise:
determining that the first calibration error meets or exceeds a threshold error value;
determining a second search precision associated with a second grid;
associating, based at least in part on a third orientation of the first sensor and a fourth orientation of the second sensor, the first sensor data and the second sensor data with the second grid; and
determining a second calibration error.

14. The one or more non-transitory computer-readable media of claim 11, wherein calibrating the at least one of the first sensor based at least in part on the first calibration data or the second sensor based at least in part on the second calibration data comprises calibrating the first sensor based at least in part on the first calibration data, the operations further comprising:
receiving, based at least in part on the first calibration data, first calibrated sensor data captured by the first sensor;
generating, based at least in part on first calibrated sensor data, a trajectory for an autonomous vehicle to follow; and
controlling the autonomous vehicle based at least in part on the trajectory.

15. The one or more non-transitory computer-readable media of claim 11, wherein determining the calibration error comprises determining a Shannon entropy.

16. A system comprising:
one or more processors; and
one or more non-transitory computer-readable media storing instructions executable by the one or more processors, wherein the instructions cause the system to perform operations comprising:
receiving first sensor data captured by a first sensor;
receiving second sensor data captured by a second sensor;
associating, based at least in part on a first orientation of the first sensor and a second orientation of the second sensor, the first sensor data and the second sensor data with a grid comprising a plurality of cells, wherein a size of a cell of the plurality of cells is based on a search precision for determining calibration data;
determining, based at least in part on the associating the first sensor data and the second sensor data with the grid, a calibration error;
determining, based at least in part on the calibration error, at least one of first calibration data associated with the first sensor or second calibration data associated with the second sensor; and
calibrating at least one of the first sensor based at least in part on the first calibration data or the second sensor based at least in part on the second calibration data.

17. The system of claim 16, wherein:
the calibration error is a first calibration error associated with a first search precision;
the grid is a first grid; and
the operations further comprise:
determining that the first calibration error meets or exceeds a threshold error value;
determining a second search precision associated with a second grid;
associating, based at least in part on a third orientation of the first sensor and a fourth orientation of the second sensor, the first sensor data and the second sensor data with the second grid; and
determining a second calibration error.

18. The system of claim 16, wherein calibrating the at least one of the first sensor based at least in part on the first calibration data or the second sensor based at least in part on the second calibration data comprises calibrating the first sensor based at least in part on the first calibration data, the operations further comprising:
receiving, based at least in part on the first calibration data, first calibrated sensor data captured by the first sensor;
generating, based at least in part on first calibrated sensor data, a trajectory for an autonomous vehicle to follow; and
controlling the autonomous vehicle based at least in part on the trajectory.

19. The system of claim 16, wherein determining the calibration error comprises determining a Shannon entropy.

* * * * *